July 18, 1961 P. GERKE ET AL 2,993,093

ELECTRONIC ROUTING SELECTOR FOR COMMUNICATION SYSTEMS

Filed April 3, 1959 3 Sheets-Sheet 1

Inventors.
Peter Gerke, &
Heinz-Ortwin Renner.
By [signature] Atty

July 18, 1961 P. GERKE ET AL 2,993,093

ELECTRONIC ROUTING SELECTOR FOR COMMUNICATION SYSTEMS

Filed April 3, 1959 3 Sheets-Sheet 2

Inventors.
Peter Gerke, &
Heinz-Ortwin Renner.
By [signature] Atty.

July 18, 1961 P. GERKE ET AL 2,993,093

ELECTRONIC ROUTING SELECTOR FOR COMMUNICATION SYSTEMS

Filed April 3, 1959 3 Sheets-Sheet 3

Inventors.
Peter Gerke, &
Heinz-Ortwin Renner.
By [signature] Atty

United States Patent Office 2,993,093

Patented July 18, 1961

2,993,093

ELECTRONIC ROUTING SELECTOR FOR COMMUNICATION SYSTEMS

Peter Gerke, Munich-Solln, and Heinz-Ortwin Renner, Munich, Germany, assignors to Siemens & Halske Aktiengesellschaft Berlin and Munich, a corporation of Germany Filed Apr. 3, 1959, Ser. No. 803,935
Claims priority, application Germany Apr. 15, 1958
7 Claims. (Cl. 179—18)

Figures 1, 2:
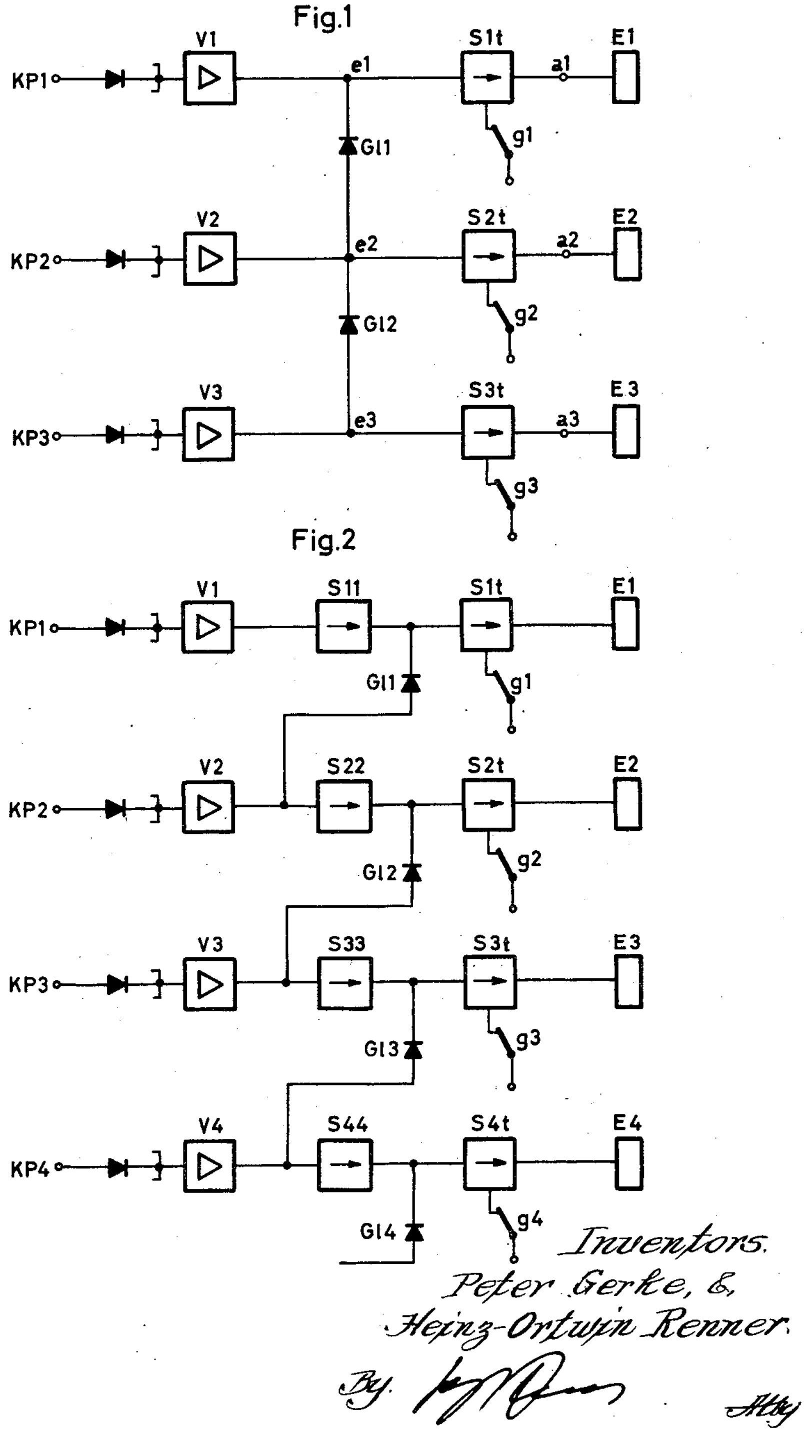

This invention relates to electronic routing selectors for communication systems and is particularly concerned with a circuit arrangement for an electronic selector, for example, for use in routing extension of calls in communication systems including telephone systems. The present invention may be considered in the nature of a further development on the electronic selector disclosed in copending application Serial No. 665,219, filed June 12, 1957. Routing operations are of importance, for example, in the extension of long distance calls in which several connection paths are available in selectable sequence. Routing selectors are provided in the selection of the path to be used in automatic by-pass extension of connections.

The electronic routing selector described in the copending application has a plurality of inlets and outlets. The inlets are connected with the outlets by way of electronic switching means. The idle condition and the busy condition of an outlet are signified by predetermined potentials which for the sake of convenience shall be referred to as busy potential and as idle potential. The inlets of the selector are by way of respectively associated electronic switches coupled with outlets respectively allotted thereto and are also coupled stagewise in selectable sequence with electronic switches of other outlets by way of correspondingly polarized coupling rectifiers. Upon marking a predetermined inlet, such inlet is extended to its associated outlet, if such outlet is idle, and if the corresponding outlet is busy, the involved inlet is routed to the next idle outlet. In order to obtain high-ohmic inlets in such selector, an amplifier stage is connected ahead of the respective inlets.

The electronic switch of a given stage is in such selector in some circumstances affected by a marking potential which is extended by way of the previously mentioned coupling rectifiers which are respectively connected in series over several stages of the selector. The coupling rectifiers are incident to the control of the electronic switches of the given predetermined stage affected in pass direction by the marking potential. It is thereby unavoidable that a voltage drop, though only slight, occurs at the coupling rectifiers, making the magnitude of the marking potential in back of the coupling rectifiers lower than that ahead thereof. It is accordingly difficult to construct selectors in which as many such coupling rectifiers as desirable are connected in series; only a limited number of coupling rectifiers must accordingly be connected in series. It follows, therefore, that it is impossible to provide for a by-pass routing involving as many selector stages as may be desired.

The object of the invention is to overcome this limitation and to extend the applicability of the selector in advantageous manner. This is achieved by the provision of switching means, allocated to the coupling rectifiers, for compensating the voltage drop occurring at the coupling rectifiers responsive to marking potential affecting them in pass direction. A by-pass routing can in this manner be effected taking into consideration as many possible connection paths as may be desirable.

In the embodiments to be presently described, compensation switches are employed as switching means allocated to the coupling rectifiers, such compensation switches being disposed in series with the corresponding coupling rectifiers and, responsive to marking potential appearing at their inlets, giving off at their outlets a similar output potential which is however higher by at least the amount of the voltage drop.

Figure 3:
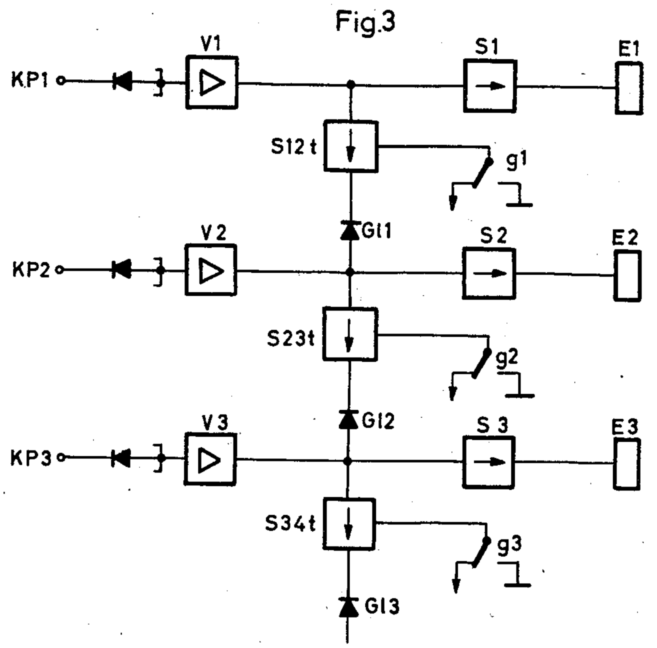
Figure 4:
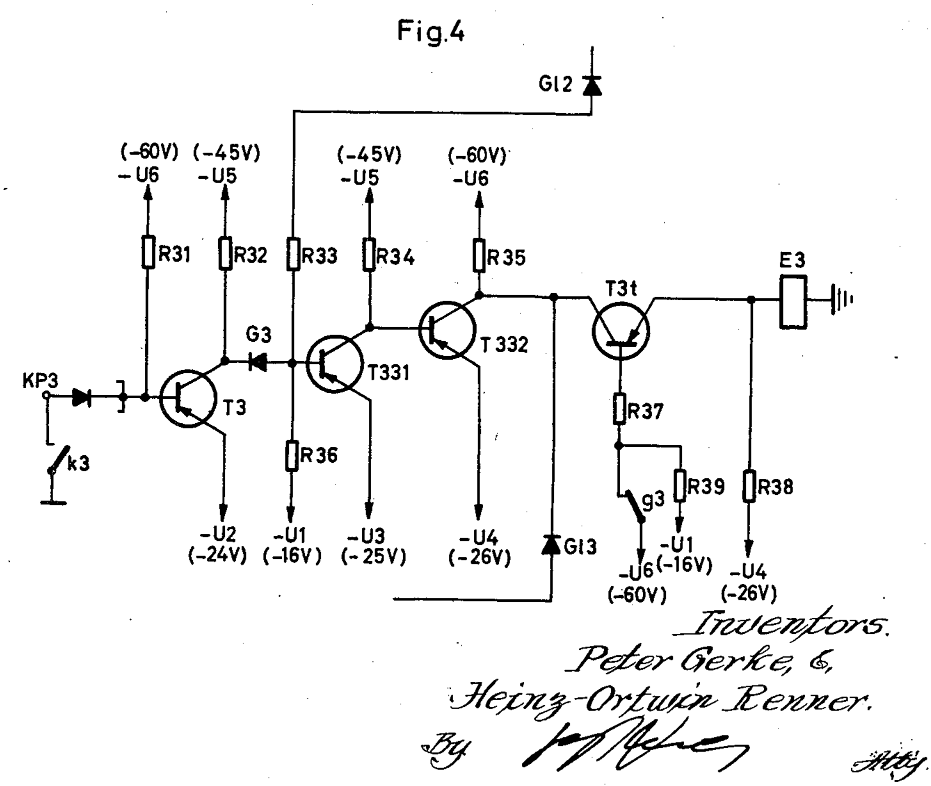
Figure 5:
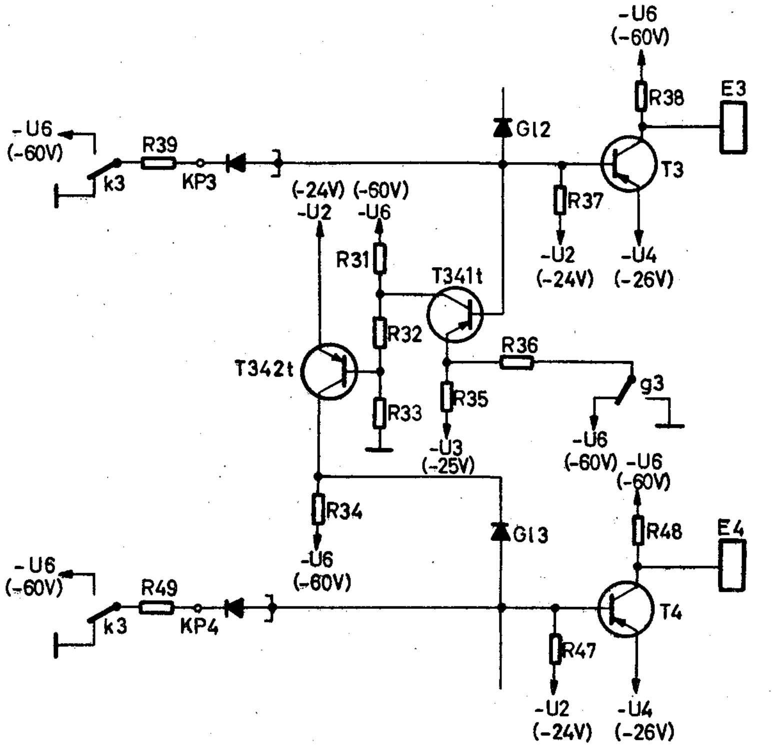

The various objects and features of the invention will appear in the course of the description thereof which is rendered below with reference to the accompanying drawings. In the drawings, FIG. 1 represents a circuit embodying the principles employed in an electronic selector according to the previously mentioned copending application, which does not include a compensation switch;

FIGS. 2 and 3 illustrate circuits embodying the principles to be employed in connection with selectors including compensation switches; and FIGS. 4 and 5 show more detailed circuits each for a stage of an electronic selector, employing transistors.

The electronic selector shown in FIG. 1 includes features also incorporated in the selector according to FIG. 2 of the copending application. The selector has three identically constructed selection stages. The selector inlet *e1* of the first stage is by way of amplifier V1 connected with the marking terminal KP1 at which the selector inlet *e1* is triggered by a marking potential signifying the demand for a selector outlet. The predetermined marking potential is thereby extended to the electronic switch S1*t* and to the coupling rectifier G11 of the corresponding selector stage. The electronic switch S1*t* is additionally affected from the outlet marker conductor, which is associated therewith, by way of contact *g1*. The purpose of this contact is to designate whether the selector stage outlet is busy or idle. If the selector stage outlet is idle, contact *g1* will be closed, and the electronic switch S1*t* is responsive to the marking potential extended by way of amplifier V1 actuated to assume a switching position in which it connects to its output *a1* a potential for operatively controlling the evaluation element E1 connected thereto. Another feature of the electronic switch S1*t* is that its input is in such switching position affected so as to cause substantial breakdown of the marking potential extended thereto. The marking potential which otherwise would be extended by way of the coupling rectifier is accordingly prevented to affect the electronic switch S2*t* of the second selector stage. However, if the selector stage outlet is busy and contact *g1* accordingly open, the electronic switch S1*t* cannot assume the indicated switching position and, in such case, the marking potential delivered by the amplifier V1 is by way of the coupling rectifier G11 extended to the electronic switch S2*t* of the second selector stage and if required to the electronic switch S3*t* of the third selector stage. If the contact *g2* associated with the electronic switch S2*t* is closed, such switch will assume the switching position in which the evaluation element E2 which is connected therewith is caused to energize. The selector inlet belonging to the marking terminal KP1 is thereby extended to the outlet of the second selector stage. In the event that contact *g2* is open, the potential is by way of the coupling rectifier G12 extended to the electronic switch S2*t* of the third selection stage, causing corresponding operations to take place. In case an electronic switch has to be operated by way of a plurality of coupling rectifiers, it may happen, as already mentioned before, that the disturbing and in such structure unavoidable voltage drop at the coupling rectifiers prevents operative actuation thereof.

The directional conductance of the coupling rectifiers controls the routing of extensions from selector outlets to the outlets of other selector stages only in the direction from the first selector stage to the second or third stage, preventing routing in opposite direction. There is accordingly provided a routing sequence for the selector stages, operating in predetermined direction. The amplifiers V1, V2, V3 may be eliminated provided that suitable voltages are supplied for the marking at the marking terminals. This also applies to the amplifier stages indicated in FIGS. 2 and 3.

FIG. 2 shows the circuit of an electronic selector employing compensation switches which are in this case connected ahead of the inputs of the electronic switches in the individual selector stages. Thus, the compensation switch S11 in the first selector stage is connected ahead of the electronic switch S1$t$ and the compensation switch S22 is in the second selector stage connected ahead of the electronic switch S2$t$, etc., etc. The coupling rectifier extending in the routing sequence from the preceding selector stage is always connected to the input of the compensation switch of the respectively succeeding stage. Thus, the coupling rectifier G11 extending from the first selector stage is connected to the input of the compensation switch S22 of the second selector stage, and the coupling rectifier G12 extending from the second selector stage is connected to the input of the compensation switch of the third selector stage. Each coupling rectifier leading in the routing sequence to a succeeding selector stage is also connected at the connecting point between the output of the compensation switch and the corresponding electronic switch of the concerned selector stage. Thus, at the output of the compensation switch S11 there is connected the coupling rectifier G11 and at the output of the compensation switch S22 there is connected the coupling rectifier G12, etc., etc. The compensation switches according to FIG 2 compensate the voltage drop at the coupling rectifiers, since the marking potential acts in a given case always on the series circuit including a compensation switch and a coupling rectifier. The compensation switches are in the individual selector stages advantageously also utilized as amplifiers, facilitating the control of the corresponding electronic switches.

The electronic switch according to FIG. 2 operates completely analogous to the one shown in FIG. 1. For example, responsive to connection of marking potential at the marking terminal KP2, and assuming that contact $g2$ is open, preventing energization of the electronic switch S2$t$, the corresponding voltage will be extended by way of coupling rectifier G12 and compensation switch S33 to the input of the electronic switch S3$t$. The voltage drop at the coupling rectifier G12 is thereby compensated by the compensation switch S33. No marking potential will be extended to the first selector stage due to the blocking action of the coupling rectifier G11. However, if contact $g2$ is closed, the electronic switch S2$t$ of the second selector stage will energize and prevent extension of the marking potential to the third selector stage. The operations are similar responsive to similar operating conditions occurring in connection with other selector stages.

FIG. 3 shows another circuit of an electronic selector embodying the principles of the invention upon employing compensation switches. The compensation switches are in this case likewise connected in series with the coupling rectifiers, the arrangement being however so that they merely compensate the voltage drop at the coupling rectifiers without effecting any amplification in the individual selector stages. Thus, the compensation switch S12$t$ is inserted in the connecting line for the coupling rectifier G11 of the first selector stage, extending from the connecting line between the amplifier V1 and the electronic switch S1, and the compensation switch S23$t$ is inserted in the connecting line for the coupling rectifier G12 extending from the connecting line between the amplifier V2 and the electronic switch S2, etc., etc. In accordance with a special feature, the outlet marker conductors are by means of their contacts $g1$, $g2$, $g3$ connected with the respective compensation switches S12$t$, S23$t$ and S34$t$ instead of being connected with the electronic switches. The compensation switches must in this embodiment operate in particular manner, namely, they must release their output voltage only in the presence of busy condition of the outlet of the selector stage at which marking potential had been extended to the corresponding coupling rectifier. The marking potential must moreover break down at the input of the compensation switch, to such extent, that the electronic switch of the corresponding selector stage cannot be energized, thus preventing extension of a selector inlet to the outlet of the involved selector stage.

The operations of the electronic switch will now be explained with reference to an operating example.

A marking potential appearing at the marking terminal KP2, will be extended to the input of the electronic switch S2 to which are connected the coupling rectifier G11 and by way of the compensation switch S23$t$ the coupling rectifier G12. The voltage appearing at the input of the electronic switch S2 has a polarity such that the coupling rectifier G11 acts in blocking sense, thereby preventing influencing of the first selector stage. If the outlet of the second selector stage is idle, contact $g2$ will be in a position in which the voltage connected thereto causes the compensation switch S23$t$ to assume an operating position in which it does not release any output voltage. The electronic switch S2 of the second selector stage now assumes an operating position in which it releases an output voltage for the operative actuation of the evaluation device E2. The connection between the inlet and outlet of the second selector stage is thus established.

However, if the outlet of the second selector stage S2 is busy, the contact $g2$ will be in an operating position such that the voltage connected thereto will cause operative actuation of the compensation switch S23$t$ so that it releases its output voltage. Since it was assumed that there is marking potential on the inlet of the second selector stage, the output voltage from the compensation switch S23$t$ will be extended by way of the coupling rectifier G12 to the third selector stage, causing in such third stage operations corresponding to those effected in the second selector stage. The marking voltage lying at the input of the compensation switch S23$t$ breaks down responsive to its switching operations. Operative actuation of the electronic switch S2 is thereby prevented.

The coupling rectifiers prevent in this circuit disturbance of the operations of the compensation switches by marking voltages appearing at the inputs of the electronic switches S2 and S3. The compensation switches may be constructed so as to prevent disturbing influence from a selector stage to a preceding selector stage, thus taking over the functions of the coupling rectifiers, and the latter may in such case be eliminated.

Examples of circuits for electronic switches embodying the above explained principles and employing transistors for the switches will now be described with reference to FIGS. 4 and 5.

FIG. 4 shows the third stage of an electronic selector comprising compensation switches employed for the compensation of the voltage drop and also for the amplification. This selector stage contains pnp-transistors T3, T331, T332 and T3$t$. As compared with the principal circuit according to FIG. 2, transistor T3 corresponds to the amplifier V3, transistor T331 together with transistor T332 corresponds to the compensation switch S33, and transistor T3$t$ corresponds to the electronic switch S3$t$. Coupling rectifiers G12 and G13 extend respectively to and from the third selection stage. The transistors T3, T331, T332 are operated in emitter circuit and connected in a chain. They are provided with collector resistors R32, R34, R35. In addition, there are provided resistors R31, R36 for the base bias. The resistor R33 serves for properly limiting the voltage extended from the preceding selector stage by way of the coupling rectifier G12. The rectifier G3 prevents leakage of this voltage over the transistor T3 when such transistor is conductive. The circuit for the transistor T3*t* acts as a coincidence circuit, the transistor becoming conductive when the contact *g*3 is closed, that is, when the selector stage outlet is idle and when the output voltage appears at the collector of the transistor T332 which constitutes the output of the compensation switch. The transistor T3*t* is provided with a base resistor R37 at which will appear either the voltage —U6 (—60 v.) extended by way of contact *g*3 or the voltage —U1 (—16 v.) extended over the resistor R39. To the emitter of the transistor T3*t* are connected the emitter resistor R38 and the evaluation device E3. The operating voltages —U1 (—16 v.) to —U6 (—60 v.) each of which is in this sequence more negative with respect to ground than the preceding one, are active with respect to the emitters, collectors and bases of the transistors. FIG. 4 also indicates examples of the magnitudes of these and of other voltages.

The operation of this selector stage will now be explained with reference to two operating conditions.

It shall first be assumed that a marking voltage is extended to the selector stage from the marking terminal KP3 for the purpose of obtaining a conductive connection between the inlet and the outlet thereof. Contact *k*3 which is provided for this purpose, is in normal condition of the selector stage open; accordingly, the transistor T3 is conductive, since its base is more negative than its emitter. The emitter voltage —U2 acts by way of the collector of transistor T3 on the base of the transistor T331 which is coupled therewith, the emitter of T331 being on the voltage —U3 and the collector thereof at the voltage —U5. The base of T331 is accordingly more positive than the emitter and T331 is blocked. The emitter of the transistor T332 is on the voltage —U4 and its collector is by way of resistor R35 on the voltage —U6 while its base is affected by the collector voltage —U5 of the transistor T331. The latter is more negative than the emitter voltage —U4 of the transistor T332 and such transistor is accordingly conductive, placing the —U4 voltage on the collector of transistor T3*t*, the same voltage —U4 also acting upon the emitter of T3*t* by way of resistor R38. There being no voltage difference between the emitter and collector of transistor T3*t*, such transistor will not be conductive. The evaluation element E3 remains at normal.

When it is now assumed that contact *k*3 is closed, ground potential will affect the base of transistor T3, placing such transistor in blocking position. Its collector voltage will accordingly become more negative and also more negative than the emitter voltage of the transistor T331, the base of which is connected thereto, and T331 accordingly will become conductive, whereby the collector voltage thereof becomes more positive, placing the transistor T332 in blocking position. The voltage —U6 now acts by way of resistor R35 on the collector of resistors T3*t*. Assuming the presence of a suitable base voltage, the transistor T3*t* can now become conductive. If the outlet of this selector stage is idle, the voltage —U6 will become operative at the base of the transistor T3*t*, since contact *g*3 is closed, and the transistor T3*t* will become conductive, whereby a much more negative voltage is extended to the evaluation element E3, causing such element to energize. The conductance of the transistor T3*t*, with the transistor T332 blocked, causes the voltage extended to the coupling rectifier G13 to become less negative than when the transistor T3*t* is likewise blocked; the coupling rectifier being now supplied from the voltage divider consisting of the resistors R35 and R38 which are interconnected over the conducting transistor T3*t*, the voltage divider lying between the voltages —U6 and the slightly negative voltage —U4. The voltage now conducted to the coupling rectifier G13 is considerably less negative than the voltage —U6 and cannot operatively affect a succeeding selector stage.

It may be mentioned here that it is particularly advantageous to connect to the emitter of the transistor T3*t* a further transistor in emitter circuit with its base as amplifier stage. The operating voltages of such transistor may be provided such that it becomes conductive when the transistor T3*t* becomes conductive. Its base voltage will in such condition tend to approach its emitter voltage which may be considerably less negative than the voltage —U6. This voltage is then extended to the next following selector stage by way of the conductive collector-emitter path of the transistor T3*t* and the rectifier G13. Since it is less negative than the voltage —U6, it cannot affect the succeeding selector stage.

However, when the outlet of the selector stage under consideration is busy, contact *g*3 will be open and the more positive voltage —U1 will become operative against the emitter voltage —U4, thus preventing the transistor T3*t* to become conductive. The voltage —U6 acts at the same time by way of resistor R35 on the coupling rectifier G13 and therewith on the succeeding selector stage, without causing a voltage rise by way of transistor T3*t* and resistor R38. The succeeding selector stage can accordingly be operatively affected.

The selector stage succeeding in the routing sequence is constructed just like the selector stage shown in FIG. 4. Therefore, in order to appreciate the effect of the extension of the negative marking voltage by way of the coupling rectifier G13, it may be assumed that FIG. 4 represents the next succeeding selector stage, which had not been affected by any marking voltage, and now receives the marking voltage (from the preceding stage) by way of coupling rectifier G12. The transistor T3 is at normal and therefore conductive and the transistor T331 is in blocking condition. The base of transistor T331 is by the negative marking voltage extended over the coupling rectifier G12 made more negative than its emitter voltage and the transistor T331 will become conductive. The rectifier G3 acts in blocking sense, thereby preventing suppression of the voltage extended by way of the coupling rectifier G12 by the less negative voltage —U2 lying at the emitter of the conducting transistor T3. The transistors T332 and T3*t* now change their operating positions and the evaluation element E3 will be energized provided that the outlet of the corresponding selector stage is idle. If it is busy, the next successive selector stage will be affected in corresponding manner by way of the coupling rectifier G13. The remaining operations are analogous to those already explained.

FIG. 5 shows the third stage and part of the fourth stage of an electronic selector in which the amplifying action of the compensation switch is utilized only for the compensation of the voltage drop at the coupling rectifiers, and in which the contacts belonging to the outlet marking conductors are in the selector stages connected to the compensation switches instead of the electronic switches. There is in this selector stage no amplifier corresponding to the amplifiers V1, V2, V3 of the other selectors. The pnp-transistors T3, T341*t* and T342*t* belong to the third selector stage. As compared with the principle circuit according to FIG. 3, the transistor T3 corresponds to the electronic switch S3, and the two transistors T341*t* and T342*t* correspond to the compensation switch S34. The coupling rectifier G12 extends from the second selector stage to the third stage, and the coupling rectifier G13 extends from the third stage to the fourth stage. The transistors T3 and T342*t* are operated in emitter circuit; they are provided with collector resistors R38 and R34. There are in addition provided base pre-resistors R37 and R33 for connecting base bias voltages. The circuit for the transistor T341*t* operates as coincidence circuit, the transistor becoming conductive when the contact *g*3 is in normal position. This is the case when the selector stage outlet is idle and when the marking voltage appears simultaneously at its base which represents the input of the compensation switch. The transistor **T341*t* is provided with the collector resistor R31. Resistors R35 and R36 are connected to the emitter. The emitter voltage is connected by way of resistor R36** and contact *g*3 depending upon the operating condition of the outlet of the third selector stage, that is, whether it is busy or idle. The base of the transistor **T342*t* is by way of resistor R32 coupled to the transistor T341*t*. In order to elucidate the cooperation of the third selector stage with the fourth selector stage, there are also shown parts of the fourth selector stage including the transistor T4 and its associated resistors R47 and R48. The operating voltages —U2, —U3, —U4 and —U6, corresponding to similar voltages in FIG. 4, operate with respect to the emitters, collectors and bases of the transistors. The marking potential is in this circuit supplied from the marking terminals by way of resistors respectively indicated at R39 (marking terminal KP3) and R49 (marking terminal KP4**).

The operation of this selector stage will now be explained assuming different functional conditions.

It shall be assumed first that the marking voltage is extended to the third selector stage from the marking terminal KP3, that is, that the selector inlet of the third selector stage demands a selector outlet which is to be conductively interconnected with such inlet. This voltage is extended by the switch-over contact *k*3 assuming its actuated position, thereby disconnecting ground from the bases of transistors **T341*t* and T3 and instead connecting thereto by way of resistor R39 the voltage —U6 which is negative with respect to ground. In the normal condition, the voltage —U2 which is extended by way of resistor R37, causes the transistors T3 and T341*t* to be blocked since their basis voltages are in such condition not more negative than their emitter voltages. The transistor T342*t* is in this operating condition conductive, since its base is connected to a point of the voltage divider consisting of the resistors R31, R32, R33, such point lying between ground and the voltage —U6 and supplying to the base a voltage which is more negative than its emitter voltage —U2. When this transistor T342*t* is conductive, the collector will have about emitter voltage —UE. This voltage is not sufficiently negative for influencing by way of the coupling rectifier G13 the next successive fourth selector stage comprising the transistor T4, etc. The blocking function of the coupling rectifier G13 prevents influencing of the transistor T342*t*** from the fourth selector stage.

The effect of the voltage —U6 extended by way of the resistor R39 to the transistors T3 and **T341*t*** may be different depending upon whether the outlet of the third selector stage is idle or busy which is respectively signified by the normal or actuated position of contact *g*3. It shall first be assumed in the following explanations, that the outlet is idle and contact *g*3 accordingly in its normal or resting position.

The emitter of the transistor **T341*t* is connected to the voltage divider R35, R36 which is in the assumed condition of the circuit on the voltages —U3 and —U6, thus placing on the emitter a voltage which is more negative than the voltage —U3. The voltage divider R35, R36 is to be dimensioned so that the emitter voltage of the transistor T341*t* will be noticeably more negative than the voltage —U4. It must be negative to such extent that the voltages appearing in the different operating conditions on the base of the transistor T341*t* are more positive than this emitter voltage, so that the transistor T341*t* remains in any case blocked. This may be obtained with certainty by corresponding dimensioning of the voltage divider R35, R36. At the emitter of the transistor T3 there is, however, the voltage —U4. The transistor T3** is in normal condition of the circuit at cut off. When the contact *k*3 assumes its actuated position, the voltage —U6 will by way of resistor R39 affect the transistors T3 and **T341*t*, the bases of which are at such instant at the center tap of the voltage divider R39, R37, lying between the voltages —U2 and —U6. This voltage divider is to be dimensioned so that the operating voltage at such instant obtained on the center tap is more negative than the emitter voltage —U4 of the transistor T3 and more positive than the emitter voltage of the transistor T341*t*. The transistor T3 is thus made conductive by the voltage obtained at the center tap between R39 and R37**.

The voltage alteration thereby effected at the collector of transistor T3 causes energization of the evaluating element E3, thereby effecting the conductive interconnection between the inlet of this selector stage and the outlet thereof which is allocated to such inlet. A by-pass operation is not effected since the transistor **T341*t*** remains at normal.

An operating condition shall now be considered, assuming that the outlet of the third selector stage is busy. Contact *g*3 will accordingly be in actuated position and will have placed ground on the resistor R36 in place of the voltage —U6 previously connected thereto.

The emitter voltage of transistor **T341*t***, as compared with the case explained before, will thereby become considerably more positive and also more positive than the collector voltage. Responsive to actuation of contact *k*3, the voltage —U6 extended by way of resistor R39 to the transistor **T341*t* will now cause the transistor T341*t* to become conductive, since its base voltage is more negative than its emitter voltage. The voltage on its collector accordingly becomes more positive, since the more positive emitter voltage acts in the conductive condition also on the collector. Consequently, the base of transistor T342*t*, coupled by way of resistor R32, receives a more positive voltage. With proper dimensioning of the resistors R31, R32, R33, this base voltage becomes more positive than the corresponding emitter voltage, and the transistor T342*t* will assume blocking or cut off condition which will make its collector voltage more negative, since the collector is now only under the influence of the voltage —U6 which is extended by way of the collector resistor R34. The voltage now conducted from the collector by way of the coupling rectifier to the fourth selector stage, is so negative that it can become effective exactly as the voltage —U6 would become effective if it had been extended by way of the associated marking terminal KP4**. The result is that a bypass switching is effected by the electronic switch from the third to the next following fourth selector stage.

It remains now to be shown that the operative actuation of the transistor **T342*t*, that is, operative actuation of the compensation switch, prevents operative actuation of the transistor T3, so as to assure proper execution of the by-pass operation. If it were otherwise, an inlet of the selector would be simultaneously extended to a plurality of outlets in different selector stages. The operative actuation of the transistor T341*t* produces at its base about the same voltage as is present on its emitter. This voltage lies between ground and the voltage —U3 and is accordingly considerably less negative than the voltage —U6 which may act upon the transistor T3 by way of the resistor R39. It is even positive against the voltage —U4 lying on the emitter of transistor T3, thus preventing the transistor T3 to become conductive. The desired effect is in this manner obtained. This effect may also be explained by stating that the marketing voltage delivered from the marking terminal breaks largely down owing to the loading of the transistor T341*t* in the conductuve condition thereof, so that it cannot place the transistor T3** in its conductive condition.

Changes may be made within the scope and spirit of the appended claims which define what is believed to be new and desired to have protected by Letters Patent.

We claim:

1. A multi-stage electronic selector for extending connections in a communication system, having for each stage an inlet and an outlet, electronic switching means for each stage, means for marking an inlet over which a connection is to be extended to an idle outlet by connecting a predetermined marking potential thereto, the electronic switching means of the stage in which a marking potential has been connected to the inlet thereof being operatively responsive to such marking potential for coupling the marked inlet with the outlet of such stage if such outlet is idle, and having coupling rectifier means and circuit means extending between the respective selector stages for routing the marking potential of said inlet to the electronic switching means of another stage so as to couple the marked inlet with the outlet of such other stage if the outlet belonging to its own stage is busy, and further switching means allotted to said coupling rectifier means for compensating the voltage drop at such coupling rectifier means occurring upon passage of voltage therethrough incident to extending a connection from the marked inlet of one selector stage to an idle outlet of another selector stage.

2. An electronic selector according to claim 1, wherein said further switching means comprises compensation switches respectively associated with said coupling rectifier means and disposed in series therewith, and means in each compensation switch responsive to a marking potential at the input thereof for delivering at its output a voltage similar to the voltage at the input but increased at least by the amount corresponding to the voltage drop occurring incident to the passage of voltage through the corresponding coupling rectifier means.

3. An electronic selector according to claim 2, wherein the respective compensation switches are disposed ahead of the corresponding electronic switching means, and means in each selector stage for connecting the coupling rectifier means from the preceding selector stage to the input of the respectively associated compensation switch while connecting the coupling rectifier means for the succeeding selector stage at a point between the output of said compensation switch and the electronic switching means of the corresponding selector stage, whereby said compensation switch is caused to operate as an amplifier in the corresponding selector stage.

4. A circuit arrangement according to claim 3, wherein said compensation switch comprises two serially connected transistors operating in emitter circuit.

5. A circuit arrangement according to claim 2, wherein said compensation switches are respectively disposed ahead of the corresponding coupling rectifier means, and means in each compensation switch for delivering a voltage at its output only responsive to busy condition of the outlet in the selector stage preceding the associated coupling rectifier means, causing the marking voltage at the input of the compensation switch to break down so as to inhibit actuation of the electronic switching means of the corresponding selector stage for the purpose of preventing extension of a selector inlet to the outlet of the corresponding selector stage.

6. A circuit arrangement according to claim 5, wherein said compensation switch comprises a first transistor operating in a coincidence circuit, said first transistor assuming a predetermined operating condition responsive to coincidence between the appearance of marking voltage and busy condition of the associated selector outlet, and a second transistor operating in emitter circuit, said second transistor being coupled to the output electrode of said first transistor and being responsive to coincidence controlled so as to deliver the required output voltage of said compensation switch.

7. A circuit arrangement according to claim 6, wherein said first transistor comprises an emitter resistor and a collector resistor, the input of the selector stage delivering said marking voltage being coupled to the base thereof, the output of the corresponding selector stage being over a resistor coupled to the emitter, and said second transistor being coupled to the collector thereof.

References Cited in the file of this patent

UNITED STATES PATENTS

| | | |
|---|---|---|
| 2,629,019 | Lesigne | Feb. 17, 1953 |
| 2,688,659 | Buchner | Sept. 7, 1954 |
| 2,859,284 | Ketchledge | Nov. 4, 1958 |
| 2,902,642 | Voegtlen | Sept. 1, 1959 |